(12) United States Patent
Roberts et al.

(10) Patent No.: US 12,071,222 B2
(45) Date of Patent: Aug. 27, 2024

(54) FLIGHT CONTROL DEVICE AND METHOD FOR INCREASED RIGGING PRECISION

(71) Applicant: Eaton Intelligent Power Limited, Dublin (IE)

(72) Inventors: Daniel Henry Roberts, Monrovia, CA (US); Tyler Quincey Curtis, Rockford, MI (US); Richard Strong Wallace, Jr., Saint Joseph, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/826,684

(22) Filed: May 27, 2022

(65) Prior Publication Data

US 2022/0380022 A1 Dec. 1, 2022

Related U.S. Application Data

(60) Provisional application No. 63/194,581, filed on May 28, 2021.

(51) Int. Cl.
*B64C 13/50* (2006.01)
(52) U.S. Cl.
CPC .................................. *B64C 13/50* (2013.01)

(58) Field of Classification Search
CPC .......... B64C 13/50; B64C 9/02; B64C 13/504; B64C 13/505
See application file for complete search history.

(56) References Cited

U.S. PATENT DOCUMENTS

| | | | | |
|---|---|---|---|---|
| 4,498,467 | A | * | 2/1985 | Kirkpatrick ............ C08G 18/08 602/8 |
| 2004/0075020 | A1 | * | 4/2004 | Trikha .................. B64C 13/505 244/99.4 |
| 2015/0081102 | A1 | * | 3/2015 | Kopp .................. F16H 61/2807 700/275 |
| 2019/0063568 | A1 | * | 2/2019 | Laskovy ................ B64C 13/505 |
| 2019/0315450 | A1 | * | 10/2019 | Fox ............................ B64C 9/02 |

* cited by examiner

*Primary Examiner* — Brady W Frazier
*Assistant Examiner* — Shanna Danielle Glover
(74) *Attorney, Agent, or Firm* — Merchant & Gould P.C.

(57) ABSTRACT

The present disclosure relates to a flight control device that can be mounted to a body of a wing of an aircraft to reduce or eliminate backlash in electromechanical actuators (EMAs). The flight control device can include a flight control member and first and second actuators for moving the flight control member relative to the wing of the aircraft. The first and second actuators can be mechanically isolated from one another except for their mutual connection to the flight control member. The first and second actuators can cooperate to apply torsional loading to the flight control member about an axis of the flight control member to reduce or eliminate backlash.

18 Claims, 3 Drawing Sheets

FLIGHT CONTROL DEVICE AND METHOD FOR INCREASED RIGGING PRECISION

CROSS-REFERENCE TO RELATED APPLICATION(S)

This application claims the benefit of U.S. Provisional Application Ser. No. 63/194,581, filed May 28, 2021, the disclosure of which is hereby incorporated by reference in its entirety.

TECHNICAL FIELD

The present disclosure relates generally to a flight control device and a method for actuating components on an aircraft wing.

BACKGROUND

Traditionally, components on an aircraft such as primary flight control components (e.g., ailerons, rudder and elevator), secondary flight control components (e.g., flaps, trimming devices, spoilers, slats, slots and speed brakes) and other components such as the landing gear have been actuated with flight control actuators.

With modern flight control actuation systems, positional accuracy is critical to know the exact position of the flight control components. Because of the design of linear electromechanical actuators (EMAs), a certain amount of backlash (e.g., free play) may be inherent. The backlash can cause uncertainty or hysteresis in the position of the control components commanded by the EMAs.

Improvements are needed to remove the backlash in electromechanical actuators for increased rigging precision.

SUMMARY

FIG. 1 illustrates a perspective view of an exemplary aircraft 10 that may be any type of aircraft such as corporate (e.g., business jet), private, commercial and passenger aircraft suitable for civil aviation, military or UAV aviation, as well as commercial/business jet. The aircraft 10 may include wings 12, fuselage 14, one or more engines 16 and tail assembly 18 of known or other type. The wings 12 may each include one or more flight control surfaces such as ailerons 20, leading-edge slats 22, spoilers 24 and trailing-edge flaps 26. The flight control surfaces can be moved to control flight using electromechanical actuators (EMAs) such as linear EMAs. The leading edge slats 22 and trailing edge flaps 26 may be considered "high-lift" flight control surfaces that may be deployed to increase the amount of lift generated by the wings 12 during landing, take-off and/or during any other appropriate phases of flight or conditions requiring increased lift.

While the aircraft is grounded, rigging can be performed to set the position of the EMAs. "Rigging" or accurate positional setting of an aircraft trailing edge flaps to "zero" or in-flight cruise position requires the movable trailing edge flap to be accurately rigged with respect to the aircraft wing. For commercial aircraft, the in-flight cruise configuration of a wing is critical as the fuel efficiency of the aircraft depends largely upon the aerodynamic efficiency of the wing when in cruise.

Trailing edge flaps may be movable between several positions to provide varying degrees of lift enhancement to the wing for operations such as take-off and landing and low speed approach. For these operations the trailing edge flap is movable between a cruise position and one or more deployed positions in which the flap is translated rearwardly and downwardly from the cruise position at the same time as being rotated.

It is desirable to precisely control the flight control surfaces during flight to limit backlash (e.g., play). Backlash can be defined as a clearance or lost motion in a mechanism caused by gaps between two parts. That is, backlash can be the maximum distance or angle through which any part of a mechanical system may be moved in one direction without applying appreciable force or motion to the next part in mechanical sequence. In the example of an actuator with mated threads, it is the amount of clearance between mated threads.

There may be a certain amount of "backlash" between the EMA and the flight control surfaces being controlled. This "backlash" is typically not an issue while the aircraft is on the ground because a gravitational weight force that acts to remove the amount of play. Similarly, during take-off, the amount of lift force acts to remove the amount of play in the system. Backlash can be mostly realized during flight while in a neutral position. Due to oscillating forces from the top and bottom acting upon the aircraft wing to drive the EMAs up or down such that the position of the EMAs is unknown because of the fluctuating forces moving it back and forth. The present disclosure addresses this concern by applying torsion to the system to remove the "backlash" in the EMAs and/or in corresponding linkages for connecting a flight control device to the wing.

One aspect of the present disclosure relates to a flight control device that can be mounted to a main body of a wing of an aircraft to reduce or eliminate backlash in electromechanical actuators (EMAs) and/or in corresponding linkages for connecting the flight control device to the wing. The flight control device can include a flight control member for mounting to the main body of the wing. The flight control member can define an axis that extends along a length of the flight control member.

The flight control device can include first and second actuators for moving the flight control member relative to the main body of wing. The first and second actuators can be coupled to the flight control member at different first and second locations spaced apart from one another along a length of the flight control member. The first and second actuators can be mechanically isolated from one another except for their mutual connection to the flight control member.

The flight control device can also include an electronic controller for coordinating operation of the first and second actuators as the flight control member is moved relative to the main body of the wing. When the flight control member is in at least one predetermined position relative to the main body of the wing, the electronic controller can be programmed to control actuation of the first and second actuators such that the first and second actuators cooperate to apply torsional loading to the flight control member to reduce or eliminate backlash.

Another aspect of the present disclosure relates to an actuating apparatus for rigging a flight control member mounted on an aircraft wing. The flight control member defines an axis that extends along a length of the flight control member. The apparatus can include first and second actuators for moving the flight control member relative to the aircraft wing. The first and second actuators can be coupled to the flight control member at different first and second locations spaced apart from one another along the length of the flight control member. The first and second actuators can be mechanically isolated from one another except for their mutual connection to the flight control member.

The first and second actuators can be controlled via an electronic controller as the flight control member is moved relative to the aircraft wing in which the first and second actuators cooperate to apply torsional loading to the flight control member to reduce or eliminate backlash.

A further aspect of the present disclosure relates to a method of rigging a flight control member mounted on an aircraft wing. The flight control member defines an axis that extends along a length of the flight control member. The method can include the steps of providing first and second actuators for moving the flight control member relative to the main body of wing. The first and second actuators can be mechanically isolated from one another except for their mutual connection to the flight control member.

The method can also include a step of programming an electronic controller for controlling the first and second actuators such that the first and second actuators cooperate to apply torsional loading to the flight control member about the axis of the flight control member to reduce or eliminate backlash.

These and other features and advantages will be apparent from a reading of the following detailed description and a review of the associated drawings. A variety of additional aspects will be set forth in the description that follows. The aspects can relate to individual features and to combinations of features. It is to be understood that both the foregoing general description and the following detailed description are exemplary and explanatory only and are not restrictive of the broad concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
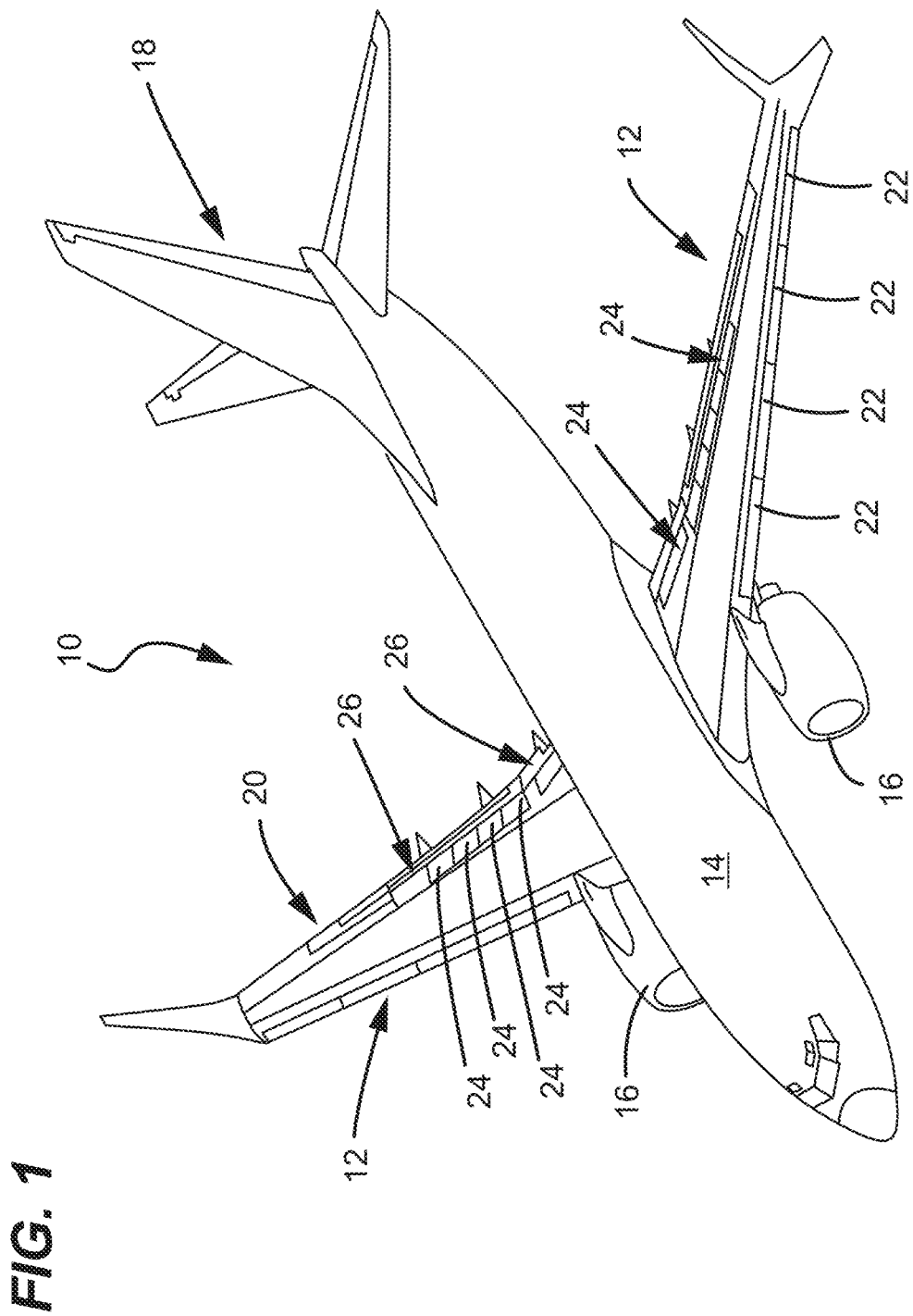
FIG. 1 is a perspective view of an exemplary aircraft illustrating flight control components.

The present disclosure relates to a flight control device that includes a flight control member mounted to a body of the wing of the aircraft. The flight control member can be movable relative to the wing via electromechanical actuators (EMAs).

In flight control systems, a degree of backlash or play may be present between the flight control member and the electromechanical actuators. Normally this backlash is not of concern especially in situations where the aircraft is on the ground and gravitational weight force acts to remove the amount of backlash in the system. Similarly, backlash is of little concern during take-off in which lift force acts to remove backlash in the system.

Typically, during flight where the flight control member is in a neutral position backlash allows the flight control movement to move slightly up and down with respect to the neutral position. To address this issue, in accordance with the principles of the present disclosure, actuator-generated mechanical loads can be applied in opposite directions to the flight control member to generate torsion in the flight control member that reduces or eliminates backlash and assists in maintaining the flight control member in the neutral position. Torsional load is applied which causes the flight control member to twist and elastically deform such that any backlash or free play in the electromechanical actuators or other linkages can be reduced or eliminated. By torsionally loading the flight control member, the inherent elasticity of the flight control member can be used to retain actuators and linkages coupled to the flight control member is a state in which backlash is reduced or eliminated (i.e., free-play is eliminated from the system using the inherent elasticity of the flight control member which opposes the torsional loading). The backlash is removed such that the flight control member can be held in a neutral position and not oscillate due to any free play.

During initial rigging of the flight control member with respect to the wing, the actuators can be precisely incrementally adjusted in opposite directions to incrementally apply torsion to the flight control member until the backlash is removed from the system. Once the backlash is removed, an angle of the flight control member (e.g., an angle with respect to horizontal) can be measured (e.g., with an inclinometer) without backlash error. The measurement of the flight control angle can be taken at a midpoint between the actuators apply torque to the flight control member. The actuators can be adjusted while maintaining sufficient torsion on the flight control member to eliminate backlash until the neutral position is established. Data relating to the determined amount of extension or retraction of the actuators which eliminates backlash and positions the flight control member in the neutral position can be stored in memory of an electronic controller such that that data can be used by the electronic controller in flight to move the flight control member to the neutral position established during rigging. Once again, when the actuators return the flight control member to the neutral position established during rigging, the actuators are moved to actuated positions in which sufficient torsion is concurrently applied to the flight control member to eliminate backlash in the system. The same process can be used to establish a plurality of additional actuators settings corresponding to different angles of the flight control member where it is desired to eliminate the effects of backlash.

Figure 2:
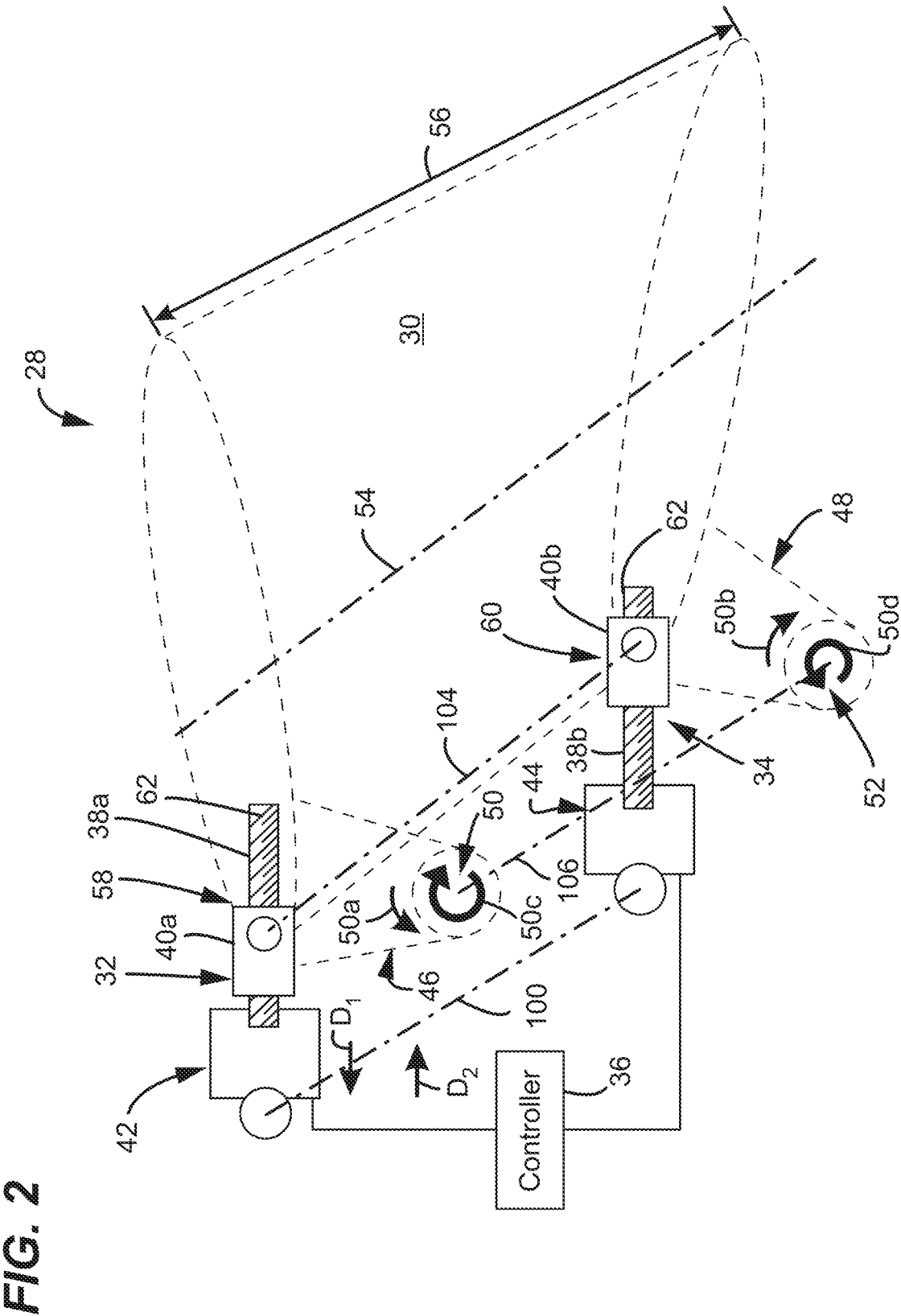
FIG. 2 is a schematic view illustrating first and second actuators on a single panel of an aircraft wing with backlash removed.
Figure 3:
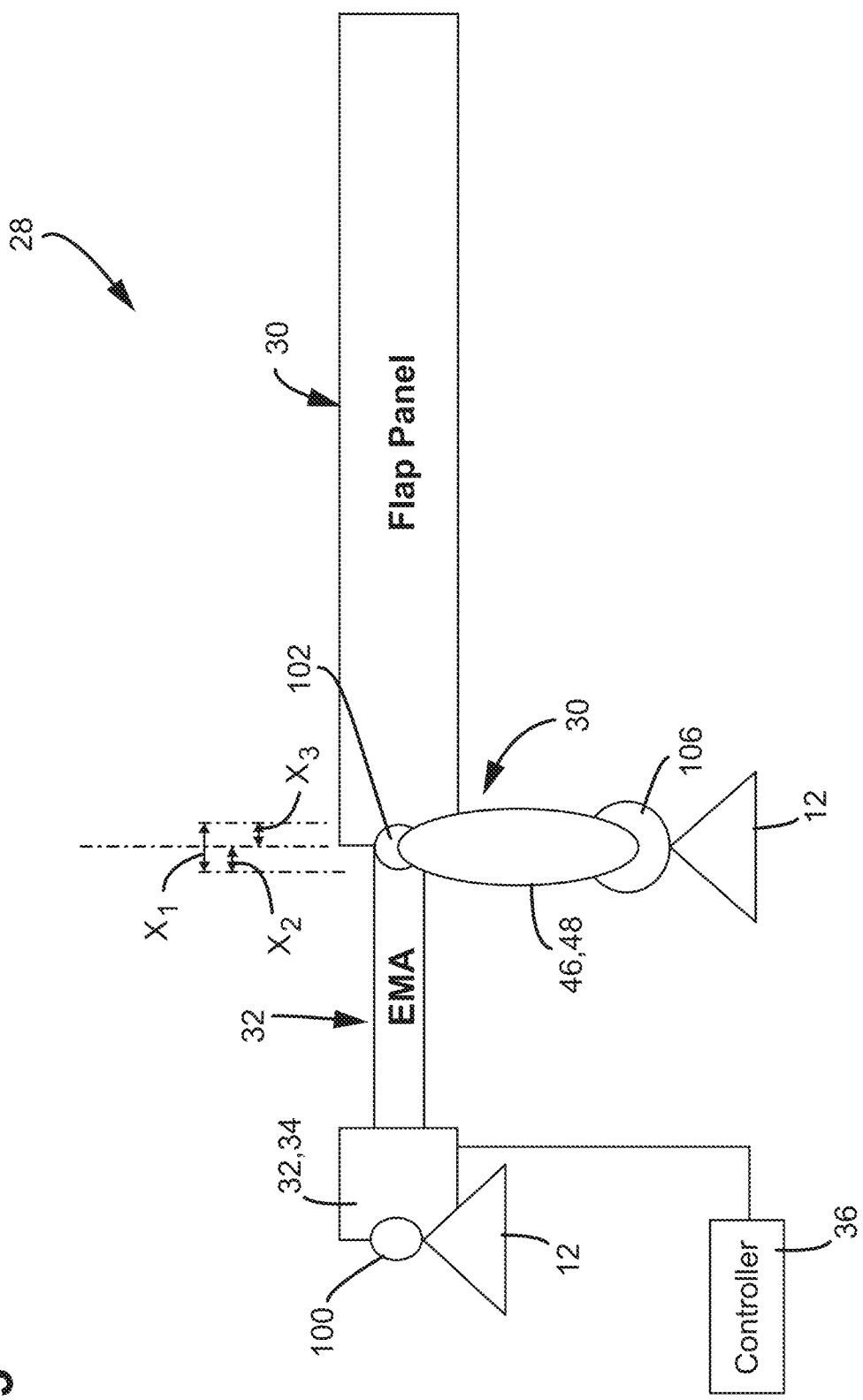
FIG. 3 is a schematic view of a flight control device shown in a neutral position in accordance with the principles of the present disclosure.

FIG. 2 is a perspective view of an exemplary flight control device 28 that includes a flight control member 30, a first actuator 32, a second actuator 34, and an electronic controller 36 (see FIG. 3). The electronic controller 36 interfaces with the first and second actuators 32, 34 to coordinate actuation of the first and second actuators 32, 34 to move the flight control member 30. The first and second actuators 32, 34 can function as an actuating apparatus for actuating the flight control member 30 relative to the wing 12. The flight control member 30 is preferably a flap but could be any other type of flight control member. Example other flight control members include ailerons, slats, and spoilers to name a few. The first and second actuators 32, 34 can be configured to actuate the flight control member 30 relative to the wing 12.

The first and second actuators 32, 34 may include a screw type of actuator of known type, but other actuators can be used as well. In the example illustrated in FIG. 2, the first and second actuators 32, 34 are threaded actuators. The first and second actuators 32, 34 each include a drive screw 38a, 38b and a drive nut 40a, 40b engaged with the drive screw 38a, 38b for transferring rotary motion of the drive screw 38a, 38b into linear motion of the drive nut 40a, 40b on the drive screw 38a, 38b. A first motor 42 can be configured to drive rotation of the drive screw 38a of the first actuator 32 and a second motor 44 can be configured to drive rotation of the drive screw 38b of the second actuator 34. Accordingly, the rotation of drive screws 38a, 38b may cause axial motion of the respective drive nuts 40a, 40b along the drive screws 38a, 38b.

Referring to FIG. 2, the first and second actuators 32, 34 can be pivotally connected to the wing 12 at pivot axis 100. The drive nuts 40a, 40b can be pivotally connected to the flight control member 30 at a pivot axis 102. The flight control member 30 can include mounting arms 46, 48 that project from a main body of the flight control member 30 that can be pivotally connected to the wing 12 at pivot axis 106. The operation of the actuators 32, 34 is coordinated by the electronic controller 36. However, actuators 32, 34 are not mechanically tied together except through the flight control member 30. To adjust the angle of the main body of the flight control member 30 relative to the wing 12, the actuators 32, 34 are actuated to drive the drive nuts 40a, 40b linearly on the drive screws 38a, 38b which causes the flight control member 30 to pivot about the pivot axis 106 relative to the wing 12. By driving the drive nuts 40a, 40b in opposite directions on their respective shafts 38a, 38b, the flight control member 30 is pivoted in opposite directions 50c, 50d about the pivot axis 106 by the actuators 32, 34 causing torsion to be applied to the flight control member 30 which removes backlash from the system and elastically deforms the flight control member 30 in a twisted manner. The elastic deformation of the flight control member 30 opposes the torsional loading and elastic loading of the fight control member ensures the components remain in a state where backlash is removed from the system. In one example, half the range of movement of the backlash is taken-up adjacent each of the actuators 32, 34. For purposes of illustration, it will be appreciated that twisting of the flight control member 30 is greatly exaggerated. In certain examples, relative movement of the drive nuts 40a, 40b in opposite directions to achieve torsional loading of the flight control member can be as little as only a few millimeters.

The flight control member 30 defines an axis 54 that extends along a length 56 of the flight control member 30. The first actuator 32 may be coupled to the flight control member 30 at a first location 58 (see FIG. 2) and the second actuator 34 may be coupled to the flight control member 30 at a second location 60 (see FIG. 2). The first and second locations 58, 60 may be spaced apart along the length 44 of the flight control member 30. The first and second actuators 32, 34 can be mechanically decoupled from one another to allow the first and second actuators 32, 34 to move independently of one another. As such, the first and second actuators 32, 34 may be moved differently (i.e., in opposite directions) to apply a torsional load to the flight control member 30 in circumstances where backlash is a concern. Such movement can be coordinated through the electronic controller 36. That is, the electronic controller 36 may be used to coordinate operation of the first and second actuators 32, 34 as the flight control member 30 is moved relative to the wing 12.

In certain situations, backlash (i.e., free play) may exist between the first and second actuators 32, 34 and the flight control member 30. The free play between internal threads (not shown) of the drive nuts 40a, 40b and external threads 62 of the driver screws 38, 38b creates backlash in the first and second actuators 32, 34 and consequently permit backlash between the first and second actuators 32, 34 and the flight control member 30. That is, due to tolerances between threads of the drive nuts 40 and driver screw 38, a small amount of movement is permitted when the flight control component is in a neutral position. Backlash may also be present in the various linkages used to couple the actuators 32, 34 and the flight control member 30 together and to the wing 12.

Turning to FIG. 3, the first and second actuators 32, 34 can be positioned to allow the flight control member 30 to be placed in a neutral position. During flight, the flight control member 30 becomes weightless such that oscillating air forces may be applied to both the top and bottom sides of the flight control member 30 such that the flight control member 30 flutters up and down due to the backlash and is not held in a neutral position. Unlike when the aircraft 10 is on the ground and gravitational weight force is applied in one direction or during takeoff when the force of air is applied in one direction, during neutral or cruise conditions, there is no dominate force. Thus, fluctuating air forces can move the flight control member 30 in and out of the neutral position. This makes it difficult to know the position of the flight control member 30, which is undesirable.

The advantageous feature of the flight control device 28 according to the present disclosure is the ability to prevent backlash while the aircraft 10 is cruising such that the flight control member 30 can be maintained in the neutral position and not oscillate. This is accomplished by applying differential loading on the first and second actuators 32, 34. That is, the first and second actuators 32, 34 can be spaced apart along the length 56 of the flight control member 40 such that when actuated, torsional load can be applied to the flight control member 30. The flight control member 30 can twist (i.e., elastically deform or flex) due to the torsional load such that the backlash in the first and second actuators 32, 34 and other components can be eliminated.

Turning to FIG. 3, a total play distance $X_1$ is shown that represents the amount of free play/backlash in the system. To eliminate the free play/backlash, the nut 40a of the first actuator 32 can be moved in a first direction $D_1$ along the screw 28a and the nut 40b of the second actuator 34 can be moved in a second direction $D_2$ along the screw 38b opposite the first direction $D_1$. Movement of the nut 40a in the first direction D1 applies torque 50a to the flight control member 30 about the axis 106. Movement of the nut 40b in the second direction D2 applies torque 50b to the flight control member 30 about the axis 106 in a direction opposite the torque 50a. The opposite torques 50a, 50b apply torsion to the flight control member 30 causing it to twist and elastically deform. The elastic twisting of the flight control member generates counter torques 50c, 50d that respectively oppose the torques 50a, 50b and cause backlash to be removed in direction D2 at the actuator 42 and in direction D1 at the actuator 44. Because the first and second actuators 32, 34 can be intentionally positioned offset from one another and are actuated in opposite directions, the free play/backlash can be taken out of both the first and second actuators 32, 34. In certain examples, the first actuator 32 can move a distance $X_2$ (see FIG. 3) to take out 50% of the total play distance $X_1$ and the second actuator 34 can move a distance $X_3$ (see FIG. 3) to take out 50% of the total play distance $X_1$ for keeping the flight control member 30 in the neutral position to eliminate free play/backlash due to the oscillating loads. Torque or torsional load can be applied to the flight control member 30 as the first and second actuators 32, 34 are actuated in opposite directions which causes the flight control member 30 to twist.

It will be appreciated that the second actuator 34 may be retracted in the first direction $D_1$ while the first actuator 32 is extended in the second direction $D_2$. In other words, as long as the first and second actuators 32, 34 are actuated to move in opposite directions, torsional load can be applied to elastically deform the flight control member 30 and hold the flight control member 30 in the neutral position to reduce or eliminate the free play/backlash.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A method of rigging a flight control member mounted on an aircraft wing, the flight control member defining an axis that extends along a length of the flight control member, the method comprising the steps of:
   providing first and second actuators for moving the flight control member relative to a main body of the aircraft wing, the first and second actuators being mechanically isolated from one another except for their mutual connection to the flight control member;
   controlling actuation of the first and second actuators such that the first and second actuators cooperate to apply torsional loading to the flight control member to reduce or eliminate backlash; and
   establishing a neutral position of the flight control member after the backlash has been removed by measuring an angle of the flight control member at a midpoint between the first and second actuators.

2. The method of claim 1, wherein the first and second actuators are incrementally adjusted in opposite directions until the backlash is eliminated.

3. The method of claim 1, wherein the first and second actuators are coupled to the flight control member at different first and second locations spaced apart from one another along the length of the flight control member.

4. The method of claim 1, wherein the first actuator is configured to remove 50% of the backlash and the second actuator is configured to remove 50% of the backlash.

5. The method of claim 1, wherein the first and second actuators each include a drive screw and a drive nut engaged with the drive screw.

6. The method of claim 5, further comprising transferring a rotation motion of the drive screw into motion of the flight control member.

7. A method of controlling a movement of a flight control member adapted to be mounted on an aircraft wing, the flight control member includes a plurality of actuators, the method comprising:
   providing the plurality of actuators for moving the flight control member relative to a main body of the aircraft wing, the plurality of actuators being mechanically isolated from one another except for their mutual connection to the flight control member; and
   controlling actuation of the plurality of actuators such that the plurality of actuators cooperate to apply torsional loading to the flight control member to reduce or eliminate backlash;
   wherein the flight control member includes an electronic controller for coordinating operation of the plurality of actuators as the flight control member is moved relative to the main body of the wing;
   wherein the method comprises determining in flight when the flight control member is in at least one predetermined position relative to the main body of the wing, and wherein the determination that the flight control member is in the at least one predetermined position causes the electronic controller to implement programming which controls actuation of the plurality of actuators such that the plurality of actuators cooperate to apply torsional loading to the flight control member to reduce or eliminate the backlash.

8. The method of claim 7, further comprising:
   establishing a plurality of additional actuators settings corresponding to different angles of the flight control member where it is desired to eliminate effects of the backlash.

9. The method of claim 7, wherein the plurality of actuators are coupled to the flight control member at different locations spaced apart from one another along a length of the flight control member.

10. The method of claim 7, further comprising transferring a rotation motion of at least one of the plurality of actuators into motion of the flight control member.

11. The method of claim 7, wherein the at least one predetermined position is a neutral position.

12. The method of claim 7, wherein the plurality of actuators includes first and second actuators.

13. The method of claim 7, wherein the plurality of actuators are threaded actuators.

14. The method of claim 7, wherein the flight control member is an aileron, a flap, or a slat.

15. The method of claim 7, wherein one of the plurality of actuators is configured to remove 50% of the backlash.

16. The method of claim 15, wherein another of the plurality of actuators is configured to remove 50% of the backlash.

17. The method of claim 7, wherein the plurality of actuators each include a drive screw and a drive nut engaged with the drive screw.

18. The method of claim 17, wherein the drive nut is configured to transfer rotary motion of the drive screw into motion of the flight control member.

* * * * *